United States Patent
More et al.

(10) Patent No.: US 9,026,704 B2
(45) Date of Patent: May 5, 2015

(54) PRIORITY BASED CONNECTION ARBITRATION IN A SAS TOPOLOGY TO FACILITATE QUALITY OF SERVICE (QOS) IN SAS TRANSPORT

(71) Applicant: LSI Corporation, San Jose, CA (US)

(72) Inventors: Shankar T. More, Pune (IN); Vidyadhar C. Pinglikar, Pune (IN); Prasad Ramchandra Kadam, Pune (IN)

(73) Assignee: LSI Corporation, San Jose, CA (US)

( * ) Notice: Subject to any disclaimer, the term of this patent is extended or adjusted under 35 U.S.C. 154(b) by 326 days.

(21) Appl. No.: 13/776,160

(22) Filed: Feb. 25, 2013

(65) Prior Publication Data

US 2014/0244875 A1    Aug. 28, 2014

(51) Int. Cl.
| | |
|---|---|
| *G06F 13/37* | (2006.01) |
| *G06F 13/40* | (2006.01) |
| *G06F 13/374* | (2006.01) |
| *G06F 13/372* | (2006.01) |
| *G06F 13/42* | (2006.01) |
| *G06F 3/06* | (2006.01) |
| *H04L 12/40* | (2006.01) |

(52) U.S. Cl.
CPC ............ *G06F 13/374* (2013.01); *G06F 13/372* (2013.01); *G06F 13/4022* (2013.01); *G06F 13/4031* (2013.01); *G06F 13/4265* (2013.01); *G06F 2213/0028* (2013.01); *G06F 2213/0032* (2013.01); *G06F 3/061* (2013.01); *G06F 3/067* (2013.01); *H04L 12/40143* (2013.01)

(58) Field of Classification Search
CPC . G06F 13/374; G06F 13/372; G06F 13/4022; G06F 13/4031; G06F 13/4265; G06F 2213/0028; G06F 2213/0032; G06F 3/061; G06F 3/067; H04L 12/40143
See application file for complete search history.

(56) References Cited

U.S. PATENT DOCUMENTS

| | | | | |
|---|---|---|---|---|
| 6,925,500 | B1 * | 8/2005 | Mizutani et al. | 709/229 |
| 7,584,319 | B1 * | 9/2009 | Liao et al. | 710/317 |
| 7,876,713 | B2 * | 1/2011 | Doherty et al. | 370/256 |
| 7,958,295 | B1 | 6/2011 | Liao et al. | |
| 8,095,722 | B1 * | 1/2012 | Liao et al. | 710/317 |
| 8,560,746 | B2 * | 10/2013 | Honjo et al. | 710/116 |
| 8,856,405 | B2 * | 10/2014 | Suzuki et al. | 710/40 |
| 2002/0075805 | A1 * | 6/2002 | Gupta et al. | 370/235 |
| 2007/0097948 | A1 * | 5/2007 | Boyd et al. | 370/351 |
| 2008/0195766 | A1 * | 8/2008 | Suzuki | 710/10 |
| 2012/0005384 | A1 * | 1/2012 | Honjo et al. | 710/109 |
| 2013/0198465 | A1 * | 8/2013 | Suzuki et al. | 711/158 |
| 2014/0143464 | A1 * | 5/2014 | Natrajan et al. | 710/117 |
| 2014/0164670 | A1 * | 6/2014 | Voorhees et al. | 710/316 |

(Continued)

*Primary Examiner* — Ryan Stiglic

(74) *Attorney, Agent, or Firm* — Suiter Swantz pc llo

(57) ABSTRACT

A method of priority based connection arbitration in a SAS topology is disclosed introducing a PRIORITY field to an SAS open Address Frame (OAF). As the expander arbitrates the multiple OAFs in competition for an Expander Link, it compares the PRIORITY fields of the arbitrating OAFs. The OAF with highest value of PRIORITY is awarded the destination connection path. In case of equal PRIORITY, the next arbitration is based on the value of Arbitration Wait Time (AWT). This priority based arbitration ensures high availability of SAS connection links to the SAS targets with high priority OAFs which in turn will lead to better quality of service for those SAS targets. PRIORITY field in the OAF is set by the SAS targets based on the current OAF priority and also set by directly attached SAS storage expanders through a modification of the OAF during transit through the expander.

18 Claims, 5 Drawing Sheets

(56) References Cited

U.S. PATENT DOCUMENTS

2014/0229651 A1* 8/2014 Weide et al. .................. 710/309
2014/0258572 A1* 9/2014 More et al. .................... 710/107
2015/0039796 A1* 2/2015 Pinglikar et al. .............. 710/114

* cited by examiner

_US 9,026,704 B2_

PRIORITY BASED CONNECTION ARBITRATION IN A SAS TOPOLOGY TO FACILITATE QUALITY OF SERVICE (QOS) IN SAS TRANSPORT

FIELD OF THE INVENTION

The present invention relates generally to routing priority of communications between Serial Attached Small Computer System Interface (SCSI) (SAS) elements. More particularly, embodiments of the present invention relate to priority connection arbitration by introducing a priority field in an open address frame.

BACKGROUND

Increasing demand for common access to a data destination requires efficient management of the access. Where two (or more) SAS open Address Frames (OAF) generated by discrete sources (initiators/targets) are attempting to access a common destination (targets/initiators), limited pathways to the destination require one of the OAFs to wait until the other is complete. Traditionally, Arbitration Wait Time (AWT) is the only factor in an arbitration decision leaving an OAF with increased demand waiting for those connected OAFs having a lesser demand.

Thus, there remains a need for a system and method for dynamic management access to available pathways to storage resources to enable a preferred OAF access while the non-preferred OAF remains in a queue for pathway access.

SUMMARY

Embodiments of the present invention include a method of priority based connection arbitration in a SAS topology by introducing a PRIORITY field in the SAS Open Address Frame (OAF). As the expander arbitrates the multiple OAFs for an Expander Link, it first compares the PRIORITY fields of the arbitrating OAFs. The OAF with highest value of PRIORITY is awarded the destination connection path. In case of equal PRIORITY, the next arbitration is based on the value of Arbitration Wait Time (AWT). This priority based arbitration while acquiring the connection path will ensure the high availability of SAS connection links to the SAS targets with high priority OAFs which in turn will lead to better quality of service for those SAS targets. In embodiments, PRIORITY field in the OAF is set by the SAS end device based on the current OAF priority. In additional embodiments, PRIORITY field in the OAF is set by expander based on the last cached PRIORITY field in the OAF request received from the host for that target. In additional embodiments, the PRIORITY field is directly attached to the OAF by SAS storage expanders through a modification of the OAF during transit through the expander (e.g. using pre-configured PRIORITY settings for the attached end devices/phys).

Accordingly, a method for priority based arbitration for Open Address Frames (OAF) competing for an Expander Link, comprising: configuring each one of a plurality of OAFs with a priority field, attaching a priority value to the priority field, receiving a current OAF priority, reading a priority field within a first OAF, reading a priority field within a second OAF, arbitrating the priority value within the first OAF with the priority value within the second OAF, routing an OAF with a higher priority value first through the Expander Link, routing an OAF with a lower priority field second through the Expander Link, and routing an OAF with an equal priority field through the Expander Link based on an Arbitration Wait Time (AWT).

An additional embodiment of the present invention may comprise a computer readable medium having non-transitory computer readable program code embodied therein for priority based arbitration for Open Address Frames (OAF) competing for a Expander Link, the computer readable program code comprising instructions which, when executed by a computer device or processor, perform and direct the steps of: configuring each one of a plurality of OAFs with a priority field, attaching a priority value to the priority field, reading a priority field within a first OAF, reading a priority field within a second OAF, arbitrating the priority value within the first OAF with the priority value within the second OAF, the arbitrating based on the current OAF priority, routing an OAF with a higher priority value first through the Expander Link, routing an OAF with a lower priority field second through the Expander Link, and routing an OAF with an equal priority field through the Expander Link based on an Arbitration Wait Time (AWT).

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention introduce a PRIORITY field in an SAS Open Address Frame (OAF). With this PRIORITY field in place, it is now efficiently possible for an expander in the connection path to identify and service the high priority connection request during the arbitration process. Preferably, SAS end devices set the priority of each of the OAFs generated by the end device. Alternatively, expanders directly attached to the SAS end devices can set the PRIORITY for an OAF before being forwarded to the required destination path. This method will ensure quality of service (QOS) to the high priority data in SAS storage.

Figure 1:
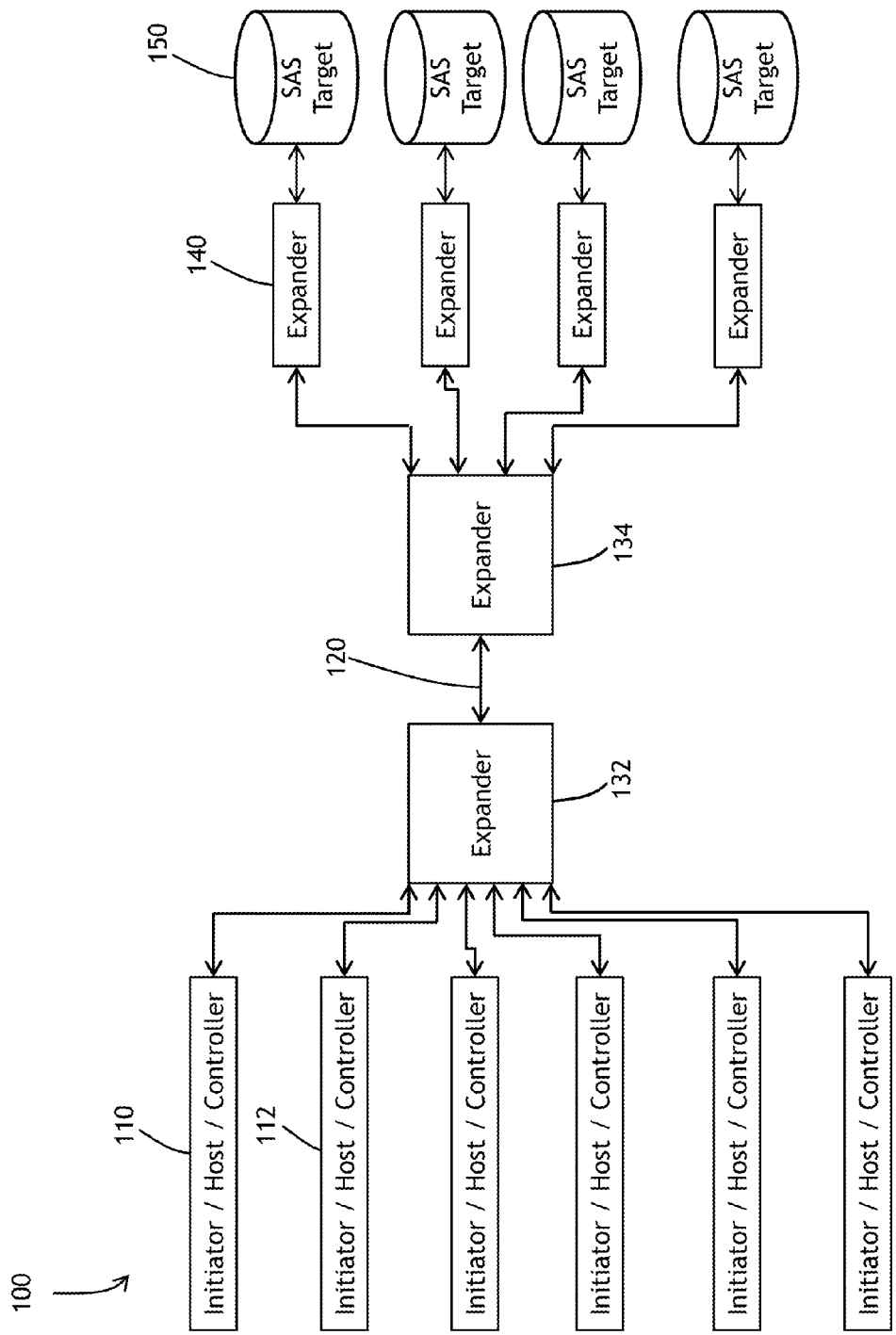
FIG. 1 is a block diagram of an exemplary system for priority based connection arbitration in accordance with an embodiment of the present invention.

Referring to FIG. 1, a block diagram of an exemplary system for priority based connection arbitration in accordance with an embodiment of the present invention is shown. Embodiments of the present invention provide for first initiator/host/controller 110 and second initiator/host/controller 112 to begin the process by requesting data from SAS target 150. Arbitration expander 134 possesses OAF priority of the storage system 100. Arbitration expander 134 arbitrates the plurality of requests for access to Expander Link 120. Expander 140 is directly attached to multiple SAS targets e.g., SAS target 150 for data transfer.

Figure 2B:
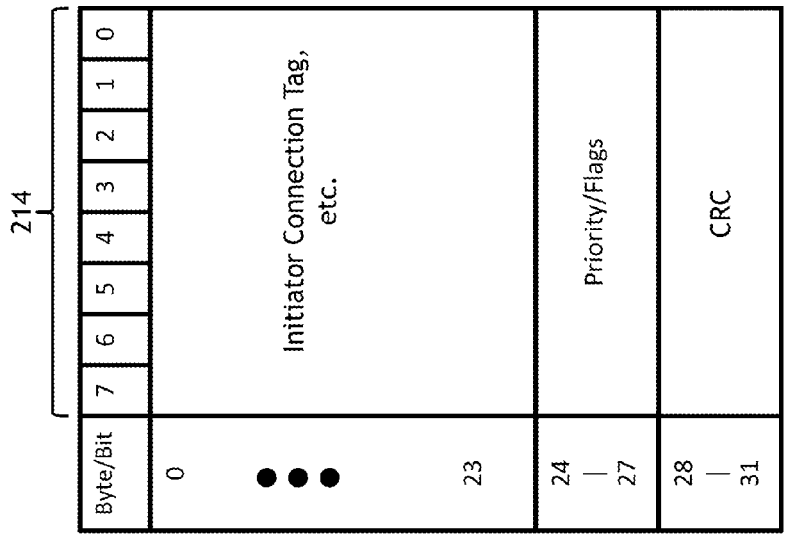
FIGS. 2A and 2B are each a diagram of OAF modification of an exemplary message in accordance with an embodiment of the present invention.
Figure 2A:
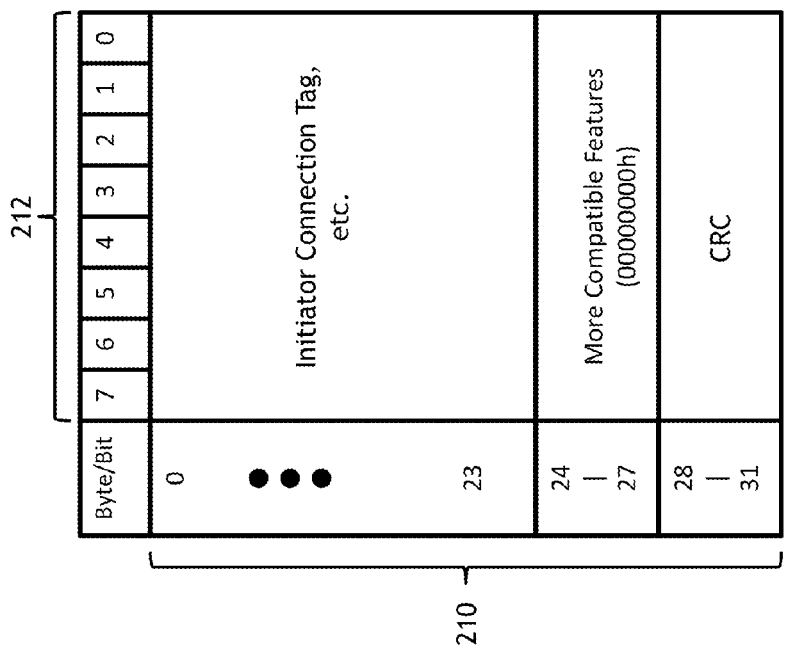

Referring to FIGS. 2A and 2B, each figure shows a diagram of OAF modification of an exemplary message in accordance with an embodiment of the present invention. It is contemplated, the size of the priority field may be variable, and may include messages of 32 bit, 16 bit, 8 bit etc. Exemplary 32 bit message 210 is comprised of an 8 bit feed 212. Exemplary lines 27 through 27 of 32 bit message 210 comprise an area where PRIORITY field is located. System 100 attached the PRIORITY field to the 32 bit message 210 for further arbitration action by arbitration expander 134. Referring to FIG. 2B, the priority flags may be specifically placed in lines 24 through 27 of 32 bit message 210. PRIORITY field is introduced as new field or it can replace an existing unused field such as MORE COMPATIBLE FEATURES (FIG. 2A). Byte lines (e.g. 0-23, 28-31) may comprise additional information concerning, for example, Initiator connection tag and cyclic redundancy check (CRC).

Figure 3:
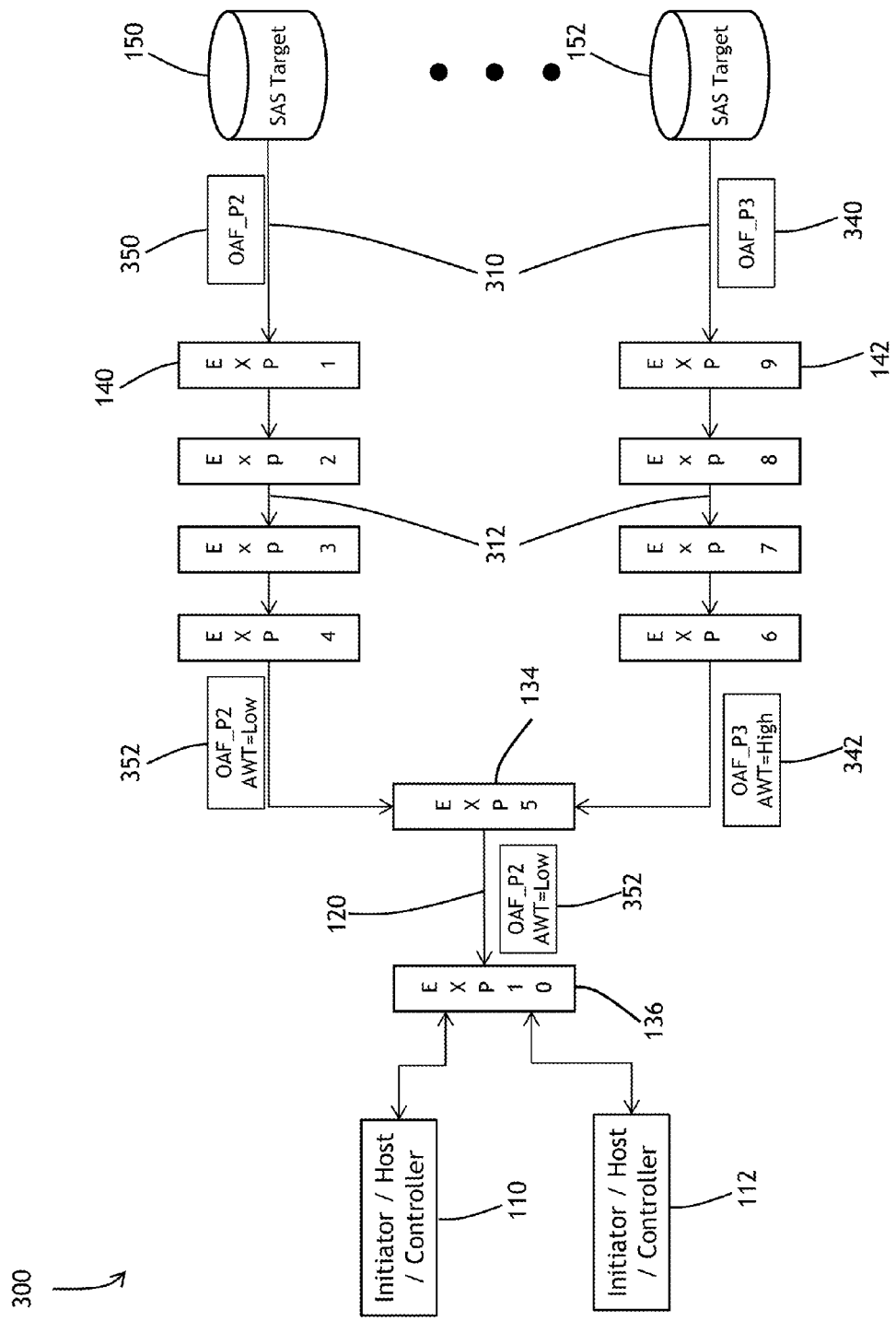
FIG. 3 is a detailed flowchart of exemplary steps of priority based arbitration of OAF in SAS in accordance with an embodiment of the present invention.

Referring to FIG. 3, a detailed flowchart of exemplary steps of priority based arbitration of OAF in SAS in accordance with an embodiment of the present invention is shown. System 300 begins with initiator/host/controller 110 and initiator/host/controller 112 requesting data from SAS targets 150 and 152. For example, initiator/host/controller 110 may request financial data from a bank represented by SAS target 150 while initiator/host/controller 112 requests access to a video file located within SAS target 152. The financial and video applications can be configured with different priorities, which the respective initiators will use to populate the PRIORITY field in OAF destined for the respective targets. Such priorities may be initiated by, for example, a storage administrator to facilitate different QoS for different applications. Upon generation of OAF from each respective SAS target 150 152, each SAS target attaches a PRIORITY field with an associated priority value (inherited from the host/initiator OAF) to the OAF. At step 310, each OAF has been generated with associated PRIORITY. OAF_P2 350 has been generated by SAS target 150 with a PRIORITY of 2 while OAF_P3 340 has been generated by SAS target 152 with an associated PRIORITY of 3. As each OAF proceeds through the expander chain each may attain an AWT. As OAF_P3 transits expander 9 142 it may accumulate a first AWT while OAF_P2 transits expander 1 is may accumulate a second AWT. At step 312 each OAF has a discrete AWT as indicated by OAF_P3 AWT=High 342 and OAF_P2 AWT=Low 352.

Since Expander Link 120 only carries a single OAF at a time, arbitration expander 134 must decide which of the OAFs requesting access its allowed connectivity. Arbitration expander 134 compares the PRIORITY field of each of the OAFs and determines the priority based on the value of priority within each PRIORITY field. Here, OAF_P2 AWT=Low is allowed connectivity to initiator/host/controller 110 through expander 10 136 even though OAF_P2 has a low AWT.

If multiple OAFs (2 or more) are arbitrating for the Expander Link 120, the OAF with highest priority is awarded the connection path. This will help in ensuring a higher QOS for the targets generating the OAF requests with high priorities. In case of equal PRIORITY between arbitrating OAFs, arbitration expander 134 uses AWT value to select the winning OAF.

In embodiments, both SAS end devices and expanders can attach the PRIORITY field and value information to each OAF. In embodiments, if SAS end devices are not capable of adding the PRIORITY information to OAF, expanders directly attached to the SAS end devices can update the OAF for the respective SAS target with the assigned/configured PRIORITY and this priority will be used for further connection arbitration.

Figure 4:
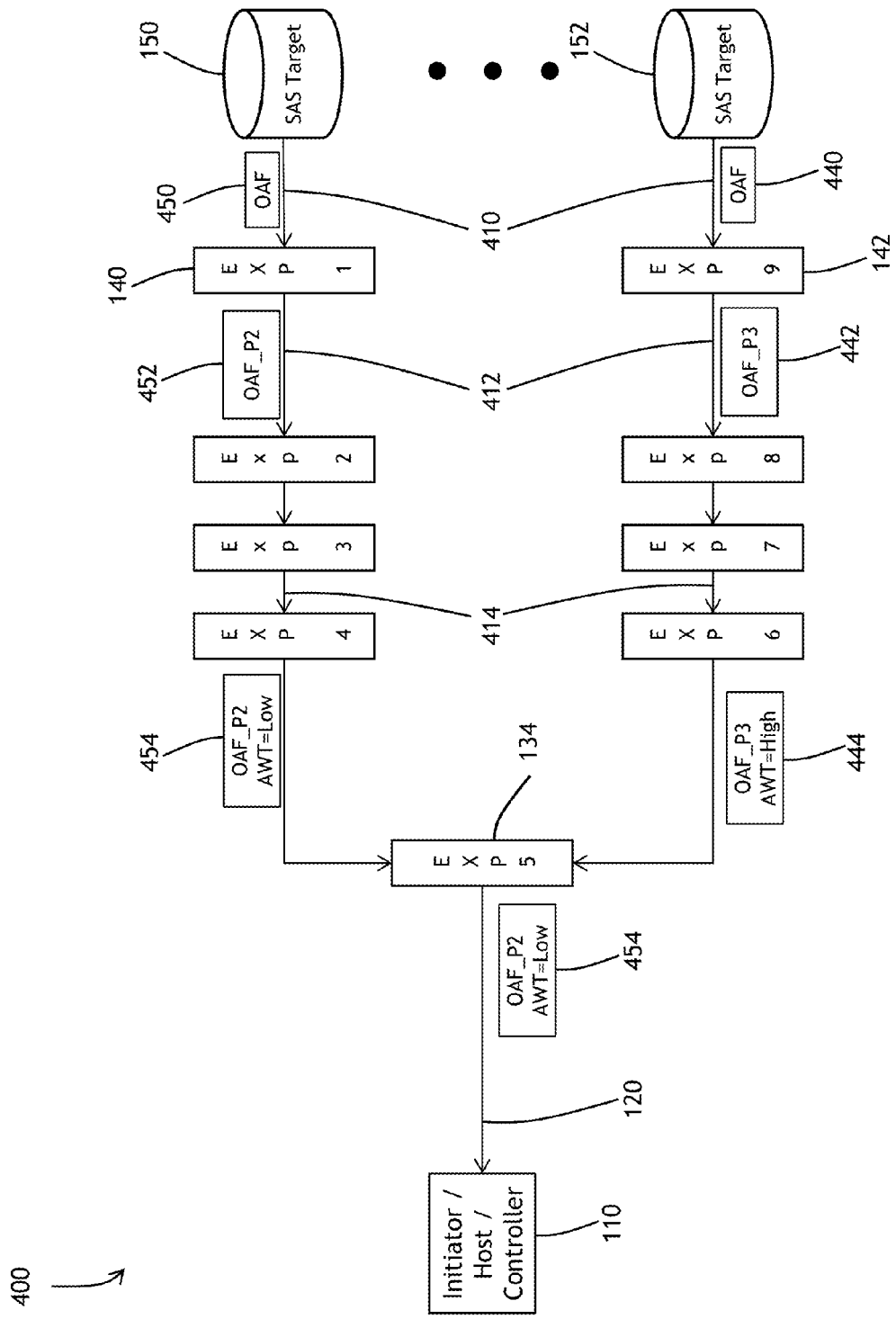
FIG. 4 is a detailed alternate flowchart of exemplary steps of priority based arbitration of OAF in SAS in accordance with an embodiment of the present invention.

Referring to FIG. 4, a detailed alternate flowchart of exemplary steps of priority based arbitration of OAF in SAS in accordance with an embodiment of the present invention is shown. Embodiments of the present invention provide for OAFs leaving a SAS target without a PRIORITY field attached to be configured with a PRIORITY field by an expander. For example, at step 410, as OAF 450 is generated by SAS target 150, OAF 450 has no PRIORITY field. Similarly, as OAF 440 is generated by SAS target 152 is also has no PRIORITY field. Directly attached expanders 1 140 and 9 142 attach and populate the PRIORITY field to each of the respective OAFs (based on the last cached PRIORITY field in the OAF request received from the host for that target or based on the pre-configured PRIORITY value for that end device/expander-phy). At step 412, OAF_P2 452 and OAF_P3 442 continue through the expander chain.

At step 414 each of the OAF has accumulated a discrete AWT in the respective path through the expander chain as indicated by OAF_P2 AWT=Low 454 and OAF_P3 AWT=High 444. Arbitration expander 134 first reads the PRIORITY field and value of each of the OAFs and determines OAF_P2 AWT=Low 454 has the higher priority to use Expander Link 120 for connection to initiator/host/controller 110.

In operation, method 400 also permits Serial Advanced Technology Attachment (SATA) targets, which maintain no awareness of OAFs, to be modified using an expander Serial Tunneling Protocol (STP) bridge to add the PRIORITY information to the OAFs generated on behalf of SATA targets.

In embodiments, expanders in the topology receive information concerning the priority of the directly attached SAS targets so that expanders can modify the Priority field in the OAFs coming from the respective targets.

Further, each expander can be configured to change the OAF priority on the fly. This periodically updated priority information will assist expanders with priority access using a SAS domain configuration application.

In embodiments comprising large topology with heavy ongoing IO, Serial Management Protocol (SMP) OAFs can be assigned higher priorities to ensure increased probability of finishing topology discovery in deterministic time frame. Additionally, each SAS target can also inherit the Priority field from the OAFs sent by the initiator, and use the same priority (inheriting host OAF priority) in its OAF requests for sending the data/responses back to the initiator.

In embodiments, each expander can be configured to reuse an open connection with dedicated priority (equivalent to creating a Fast Context Switching (FCS) channel) for extended/partial FCS to minimize connection opening overhead.

Further embodiments provide for reverse FCS using the Priority Information in the received OAF request to allow the OAF with highest priority to reuse the existing connection path.

Figure 5:
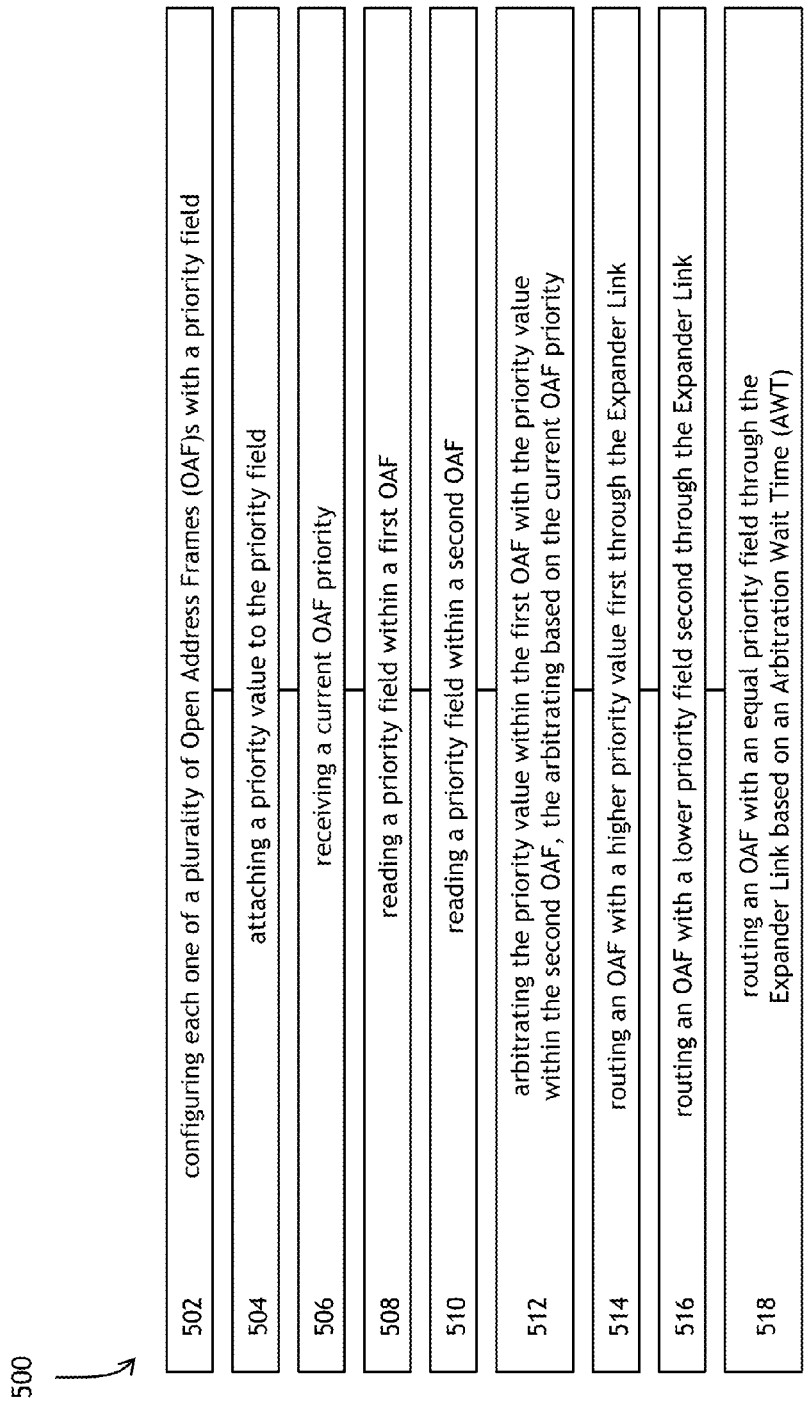
FIG. 5 is a flowchart for a method for priority based connection arbitration in a SAS topology in accordance with an embodiment of the present invention.

Referring to FIG. 5, a flowchart for a method for priority based connection arbitration in a SAS topology in accordance with an embodiment of the present invention is shown. The method comprises, at step 502, configuring each one of a plurality of OAFs with a priority field; and, at step 504, attaching a priority value to the priority field; and, at step 508, reading a priority field within a first OAF; and, at step 510, reading a priority field within a second OAF; and, at step 512, arbitrating the priority value within the first OAF with the priority value within the second OAF, the arbitrating based on the current OAF priority; and, at step 514, routing an OAF with a higher priority value first through the common destination connection path; and, at step 516, routing an OAF with a lower priority field second through the common destination connection path; and, at step 518, routing an OAF with an equal priority field through the common destination connection path based on an Arbitration Wait Time (AWT).

CONCLUSION

Specific blocks, sections, devices, functions, processes and modules may have been set forth. However, a skilled technologist will realize that there may be many ways to partition the method and system, and that there may be many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the method and system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims may be to be embraced within their scope.

In the present disclosure, the methods disclosed may be implemented as sets of instructions or software readable by a device. Further, it is understood that the specific order or hierarchy of steps in the methods disclosed may be examples of exemplary approaches. Based upon design preferences, it is understood that the specific order or hierarchy of steps in the method can be rearranged while remaining within the disclosed subject matter. The accompanying claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for priority based arbitration for Open Address Frames (OAF) competing for an Expander Link, comprising:
    configuring each one of a plurality of OAFs with a priority field;
    attaching a priority value to the priority field;
    receiving a current OAF priority;
    reading a priority field within a first OAF;
    reading a priority field within a second OAF;
    arbitrating the priority value within the first OAF with the priority value within the second OAF, the arbitrating based on the current OAF priority;
    routing an OAF with a higher priority value first through the Expander Link;
    routing an OAF with a lower priority field second through the Expander Link; and
    routing an OAF with an equal priority field through the Expander Link based on an Arbitration Wait Time (AWT).

2. The method for priority based arbitration of claim 1, wherein configuring each one of a plurality of OAFs with a priority field further comprises configuring the OAF at a Serial Attached Small Computer System Interface (SAS) target.

3. The method for priority based arbitration of claim 1, wherein configuring each one of a plurality of OAFs with a priority field further comprises configuring the OAF at a Serial Advanced Technology Attachment (SATA) target.

4. The method for priority based arbitration of claim 1, wherein configuring each one of a plurality of OAFs with a priority field further comprises configuring the OAF at an expander directly attached to the SAS target.

5. The method for priority based arbitration of claim 1, wherein configuring each one of a plurality of OAFs with a priority field further comprises configuring the OAF at a Serial Tunneling Protocol (STP) bridge.

6. The method for priority based arbitration of claim 1, wherein the current OAF priority further comprises a priority giving Serial Management Protocol (SMP) OAFs a high priority compared to the second OAF.

7. The method for priority based arbitration of claim 1, wherein attaching a priority value to the priority field further comprises at least one of: attaching a priority value received from at least one initiator and inheriting a priority value from a host OAF.

8. The method for priority based arbitration of claim 1, wherein the current OAF priority further comprises an open connection with dedicated priority optimized to minimize a connection overhead.

9. The method for priority based arbitration of claim 1, wherein the current OAF priority further comprises a reverse Fast Context Switching (FCS) using a priority value of a received OAF to reuse an existing connection path.

10. A computer readable medium having non-transitory computer readable program code embodied therein for priority based arbitration for Open Address Frames (OAF) competing for an Expander Link, the computer readable program code comprising instructions which, when executed by a computer device or processor, perform and direct the steps of:
    configuring each one of a plurality of OAFs with a priority field;
    attaching a priority value to the priority field;
    receiving a current OAF priority;
    reading a priority field within a first OAF;

reading a priority field within a second OAF;

arbitrating the priority value within the first OAF with the priority value within the second OAF, the arbitrating based on the current OAF priority;

routing an OAF with a higher priority value first through the Expander Link;

routing an OAF with a lower priority field second through the Expander Link; and routing an OAF with an equal priority field through the Expander Link based on an Arbitration Wait Time (AWT).

11. The computer readable medium of claim 10, wherein configuring each one of a plurality of OAFs with a priority field further comprises configuring the OAF at a Serial Attached Small Computer System Interface (SAS) target.

12. The computer readable medium of claim 10, wherein configuring each one of a plurality of OAFs with a priority field further comprises configuring the OAF at a Serial Advanced Technology Attachment (SATA) target.

13. The computer readable medium of claim 10, wherein configuring each one of a plurality of OAFs with a priority field further comprises configuring the OAF at an expander directly attached to the SAS target.

14. The computer readable medium of claim 10, wherein configuring each one of a plurality of OAFs with a priority field further comprises configuring the OAF at a Serial Tunneling Protocol (STP) bridge.

15. The computer readable medium of claim 10, wherein the current OAF priority further comprises a priority giving Serial Management Protocol (SMP) OAFs a high priority compared to the second OAF.

16. The computer readable medium of claim 10, wherein attaching a priority value to the priority field further comprises least one of: attaching a priority value received from at least one initiator and inheriting a priority value from a host OAF.

17. The computer readable medium of claim 10, wherein the current OAF priority further comprises an open connection with dedicated priority optimized to minimize a connection overhead.

18. The computer readable medium of claim 10, wherein the current OAF priority further comprises a reverse Fast Context Switching (FCS) using a priority value of a received OAF to reuse an existing connection path.

* * * * *